(12) United States Patent
Barriere et al.

(10) Patent No.: US 11,547,979 B1
(45) Date of Patent: Jan. 10, 2023

(54) EQUIPMENT AND METHOD FOR PREPARING AN ALDEHYDE-FUNCTIONALISED POLYMER

(71) Applicant: SPCM SA, Andrezieux Boutheon (FR)

(72) Inventors: Cyril Barriere, Andrezieux Boutheon (FR); Damien Fougerousse, Andrezieux Boutheon (FR)

(73) Assignee: SPCM SA, Andrezieux Boutheon (FR)

( * ) Notice: Subject to any disclaimer, the term of this patent is extended or adjusted under 35 U.S.C. 154(b) by 0 days.

(21) Appl. No.: 17/868,371

(22) Filed: Jul. 19, 2022

(30) Foreign Application Priority Data

Dec. 22, 2021 (EP) .................................. 21216732

(51) Int. Cl.
*B01J 19/00* (2006.01)
*B01J 19/18* (2006.01)
*C08F 8/28* (2006.01)

(52) U.S. Cl.
CPC ....... *B01J 19/0033* (2013.01); *B01J 19/0066* (2013.01); *C08F 8/28* (2013.01); *B01J 2219/00162* (2013.01); *B01J 2219/00164* (2013.01)

(58) Field of Classification Search
USPC ....................................................... 422/234
See application file for complete search history.

(56) References Cited

U.S. PATENT DOCUMENTS

2011/0146925 A1 6/2011 Bode
2017/0306065 A1 10/2017 Kerman

FOREIGN PATENT DOCUMENTS

WO WO2013128109 A1 9/2013

*Primary Examiner* — Fred M Teskin
(74) *Attorney, Agent, or Firm* — Forge IP, PLLC

(57) ABSTRACT

Equipment for preparing a polymer solution of a non-ionic, cationic, anionic or amphoteric polymer by reaction between a compound including at least one aldehyde function and at least one base polymer aqueous solution having at least one non-ionic monomer includes a reactor provided with a stirring system, as well as a recirculation loop including between the outlet of the reactor and the inlet of the reactor, a recirculation pump, a pH measuring probe, and a pressure differential in-line measuring device in the form of a calibrated tube configured to measure the pressure difference of the polymer solution between the inlet and the outlet of the calibrated tube, the calibrated tube being branched on the recirculation loop.

8 Claims, 1 Drawing Sheet

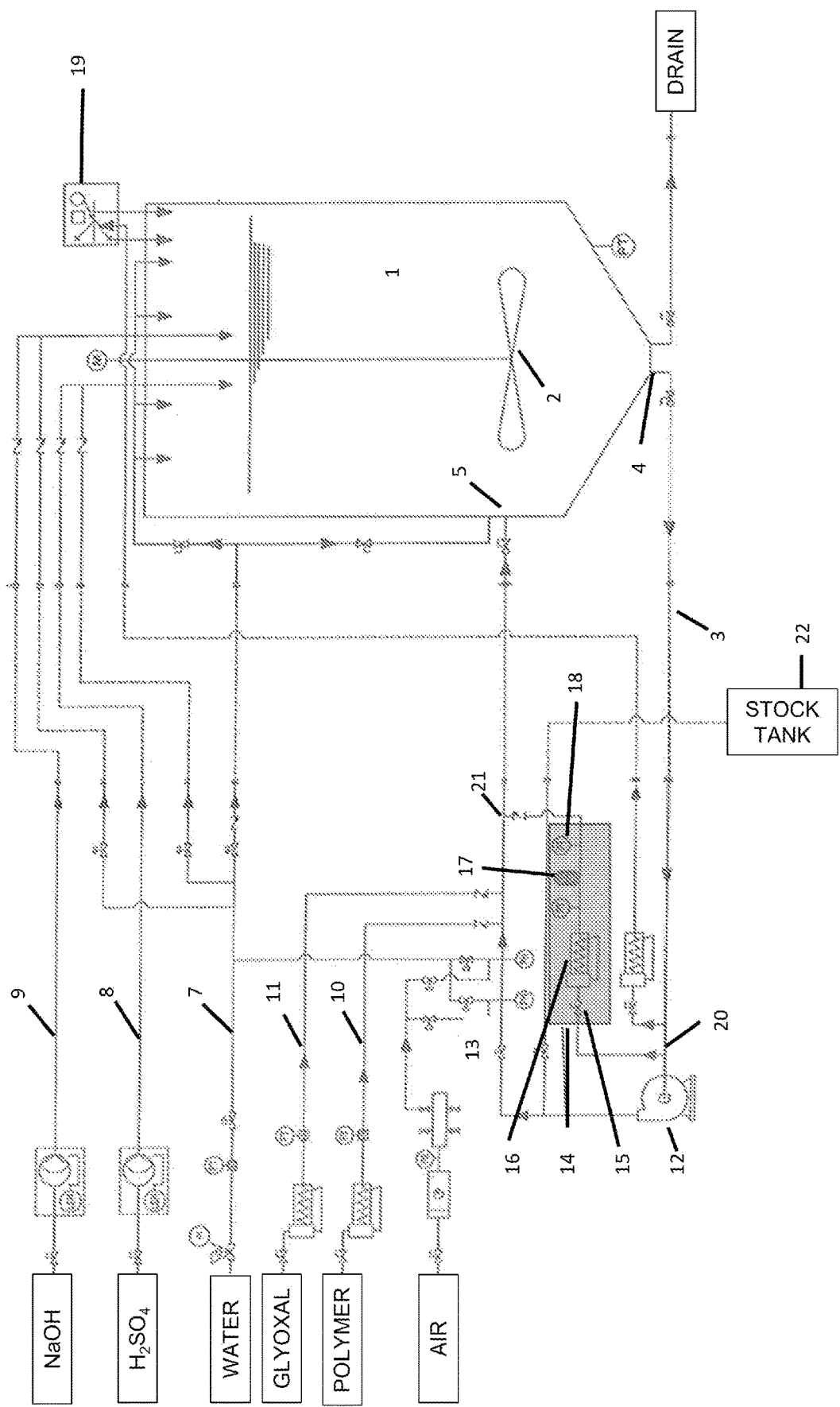

EQUIPMENT AND METHOD FOR PREPARING AN ALDEHYDE-FUNCTIONALISED POLYMER

FIELD OF THE INVENTION

The present invention relates to new equipment and a method for manufacturing polymers functionalised with an aldehyde, said polymers being advantageously implemented in a paper or cardboard manufacturing process.

BACKGROUND OF THE INVENTION

Water-soluble polyacrylamides functionalised with an aldehyde are widely used in paper manufacturing processes in particular in order to increase the dry strength of these papers. These water-soluble polyacrylamides are primarily manufactured from non-ionic, cationic, anionic or ampho-teric basic polymers.

Polyacrylamides functionalised with an aldehyde have two weaknesses:
  They are available in the form of diluted aqueous solutions containing between 5 and 12% by weight of polymer. Thus, their transfer into papermaking plants involves logistical constraints and considerable transport costs.
  These polymers in an aqueous solution have a short lifespan (between 10 and 40 days) and beyond, the polymer solutions gel.

In addition, during the production of the glyoxaled polymer, it is necessary to monitor the progress of the reaction of functionalisation with the aldehyde. This consists of a measurement of the viscosity of the polymer using a viscometer, by collecting regular samples of the reaction medium. This monitoring requires the permanent presence of an operator.

To overcome all these constraints, it is possible to manufacture these polymers functionalised with an aldehyde directly from equipment installed within papermaking plants. The difficulty of the manufacture of these polymers within the papermaking plant then lies in the means set up to automatically monitor the reaction of functionalisation with the aldehyde.

The document US 2017/0306065 of the ACAT company describes equipment for on-site glyoxalation (functionalisation of a polyacrylamide with glyoxal) with the control parameters:
  The monitoring of turbidity
  The adjustment of pH according to the temperature
  The adjustment of pH according to the reaction time
  The pH variation during the reaction
  The actual consumption of the recirculation pump.

The control parameters set forth in this document are interesting. Nevertheless, they have the drawback of not accurately reflecting the evolution of the molecular weight of the polymer throughout the glyoxalation reaction (a branching of the structure of the polymer is possible). Indeed, the turbidity measurement is sensitive to the quality of the waters (pollution, matters in suspension) and to the quality of the base polymer (impurities, colourations . . . ).

Therefore, the control of the reaction through a turbidity monitoring could lead to:
  The obtainment of a lowly glyoxaled polymer (little reaction between the glyoxal and the base polymer). The polymer solution thus obtained would then have a low evolution of its viscosity throughout the reaction.
  The obtainment of a highly glyoxaled polymer which would be in the form of an insoluble gel.

These are the drawbacks related to the reaction of functionalisation of a polymer with an aldehyde that are to be solved.

SUMMARY OF THE INVENTION

The Applicant has developed new equipment including a pressure differential in-line measuring device (delta P measurement) for continuous monitoring of the reaction of functionalisation of the polymer with an aldehyde. This equipment allows effectively controlling the functionalisation reaction and overcoming the previously-described drawbacks.

Hence, the reaction of functionalisation of a polymer with an aldehyde-functionalised derivative could be stopped (by acid addition) when the variation of the delta P values has reached a target value.

Unlike a turbidity measurement, the $\Delta P$ measurement is sensitive neither to the quality of the used waters, nor to the quality of the polymer.

Another aspect of the invention relates to a method for preparing a solution of a polymer functionalised with an aldehyde using the previously-described equipment.

More specifically, the invention relates to equipment for preparing a solution of a non-ionic, cationic, anionic or amphoteric polymer P2 by reaction between a compound comprising at least one aldehyde function and at least one aqueous solution of base polymer P1 comprising at least one non-ionic monomer selected from among acrylamide, methacrylamide, N,N-dimethylacrylamide, and acrylonitrile, said equipment comprising a reactor provided with a stirring system; as well as at least:
  a pipe intended to feed the reactor with water, advantageously its upper portion,
  a pipe equipped with a metering pump intended to feed the reactor with a polymer P1 aqueous solution,
  a pipe equipped with a metering pump intended to feed the reactor with the compound comprising at least one aldehyde function,
  a pipe equipped with a metering pump intended to feed the reactor with base, advantageously its upper portion,
  a pipe equipped with a metering pump intended to feed the reactor with acid, advantageously its upper portion,
  a recirculation loop intended to make the polymer P2 solution recirculate from the bottom of the reactor towards an upper level of said reactor.
  The equipment is characterised in that the recirculation circuit comprises between the outlet of the reactor and the inlet of the reactor, a recirculation pump, a pH measuring probe, and a pressure differential in-line measuring device in the form of a calibrated tube intended to measure the pressure difference of the polymer P2 solution between the inlet and the outlet of said calibrated tube, said calibrated tube being positioned in a bypass of the recirculation loop.

In an advantageous embodiment, feeding the reactor with the polymer P1 aqueous solution, and with the compound comprising at least one aldehyde function, is done in the recirculation loop.

In other words, the equipment comprises a pipe equipped with a metering pump intended to feed the reactor with the polymer P1 aqueous solution and a pipe equipped with a metering pump intended to feed the reactor with the compound comprising at least one aldehyde function connected to the recirculation loop.

The base polymer P1 may be non-ionic, cationic, anionic or amphoteric. Advantageously, it is water-soluble.

The term "polymer" refers to both homopolymers and copolymers.

The amphoteric polymer is a polymer comprising cationic charges and anionic charges, preferably as many anionic charges as cationic charges.

As illustrated herein, the term "water-soluble polymer" refers to a polymer that gives an aqueous solution with no insoluble particles when it is dissolved under stirring for 4 hours at 25° C. and at a concentration of 20 g·L$^{-1}$ in water.

The polymer P1 may comprise a cationic monomer which is preferably selected from the group comprising quaternised or salified dimethylaminoethyl acrylate (DMAEA), quaternised or salified dimethylaminoethyl methacrylate (DMAEMA), dimethyl diallyl ammonium chloride (DMDAAC), acrylamidopropyl trimethyl ammonium chloride (APTAC), and methacrylamidopropyl trimethyl ammonium chloride (MAPTAC).

The polymer P1 may comprise an anionic monomer which is preferably selected from among 2-acrylamido-2-methylpropane sulphonic acid, acrylic acid, methacrylic acid, itaconic acid, and/or salts thereof.

Optionally, the polymer P1 may be branched (structured) with a radical branching agent which may be selected from the group comprising sodium allyl sulfonate, sodium methallyl sulfonate, sodium methallyl disulfonate, methylenebisacrylamide, triallylamine, triallylammonium chloride, ethylene glycol diacrylate, polyethylene glycol dimethacrylate, diacrylamide, cyanomethyl acrylate, vinyloxy ethylacrylate or methacrylate. Preferably, the weight concentration of the branching agent in P1 is comprised between 5 and 5,000 ppm with respect to the polymer mass.

The structuring of the polymer P1 may also be obtained with at least one polyfunctional compound containing at least 3 heteroatoms selected from among N, S, O, P and each having at least one mobile hydrogen. In particular, this polyfunctional compound may be a polyethylenimine or a polyamine.

Advantageously, the polymer P1 contains at least 5 mol % of a non-ionic monomer selected from among acrylamide, methacrylamide, N,N-dimethylacrylamide, and acrylonitrile, preferably at least 70 mol %.

According to the present invention, the "average molecular weight by weight" of the synthetic water-soluble polymer P is determined by measuring the intrinsic viscosity. The intrinsic viscosity could be measured by methods known to a person skilled in the art and could, in particular, be calculated from the reduced viscosity values for different concentrations by a graphical method consisting in plotting the reduced viscosity values (on the ordinate axis) as a function of the concentration (on the abscissa axis) and by extrapolating the curve to a zero concentration. The intrinsic viscosity value is read on the ordinate axis or using the least-square method. Afterwards, the average molecular weight by weight could be determined by Mark-Houwink equation:

$$[\eta]=K\,M^\alpha$$

$[\eta]$ represents the intrinsic viscosity of the polymer determined by the in-solution viscosity measuring method, K represents an empirical constant, M represents the molecular weight of the polymer, $\alpha$ represents Mark-Houwink coefficient, $\alpha$ and K depend on the particular polymer-solvent system. Tables known to a person skilled in the art give the values of a and K depending on the polymer-solvent system.

The polymer P1 has an average molecular weight advantageously greater than or equal to 100,000 daltons, even more advantageously greater than or equal to 200,000 daltons. Advantageously, it is less than or equal to 2 million daltons, even more advantageously less than 1 million daltons. Preferably, the polymer P1 has an average molecular weight advantageously comprised between 100,000 daltons and 2 million daltons, even more advantageously comprised between 200,000 daltons and 1 million daltons.

The compound comprising at least one aldehyde function reacting on P2 to give P1 is advantageously selected from among glyoxal, glutaraldehyde, furan dialdehyde, 2-hydroxyadipaldehyde, succinaldehyde, dialdehyde starch, 2,2-dimethoxyethanal and combinations thereof. Even more preferably, the compound comprising at least one aldehyde function is glyoxal.

Preferably, the pressure differential in-line measuring device is branched on the recirculation circuit on either side of the recirculation pump.

In a particular embodiment, the pressure differential in-line measuring device is in the form of a circuit provided with an inlet point positioned upstream of the recirculation pump and an outlet point positioned downstream of the pH measuring probe.

When the reactor is fed with the polymer P1 aqueous solution and with the compounds comprising at least one aldehyde function via the recirculation loop, the outlet point of the differential in-line measuring device is positioned downstream of the supply points of the polymer P1 and of the compounds comprising at least one aldehyde function.

Advantageously, the pressure differential in-line measuring device further comprises:
- a control valve allowing maintaining a constant flow rate in a calibrated tube,
- a flowmeter allowing measuring and regulating the flow rate downstream of the control valve.

According to another preference, the pressure differential in-line measuring device comprises, advantageously downstream of the control valve, a two-stage filter with meshes comprised between 5 to 50 microns.

According to another preference, the pressure differential in-line measuring device comprises a pulsation dampener of the recirculation loop advantageously positioned between the double-stitched filter and the control valve.

Preferably, the base flowing in the pipe is sodium hydroxide (soda) in an aqueous solution.

Preferably, the acid flowing in the pipe is sulphuric acid in an aqueous solution.

Preferably, the equipment of the invention comprises a turbidimeter directly connected on the upper portion of the reactor.

The invention also relates to a method for preparing a solution of a non-ionic, cationic, anionic or amphoteric polymer P2 derived from the reaction between a compound comprising at least one aldehyde function and at least one aqueous solution of base polymer P1 comprising at least one non-ionic monomer selected from among acrylamide, methacrylamide, N,N-dimethylacrylamide, and acrylonitrile, by means of the equipment of claims 1 to 6, said method comprising the following successive steps:
- feed the reactor with water and activate the recirculation pump,
- feed the reactor, preferably the reticulation circuit, with the polymer P1 and activate the stirring system,
- feed the reactor, preferably the reticulation circuit, with the compound comprising at least one aldehyde function, feed the reactor with base and stop the addition when the pH measuring probe indicates a pH comprised between 8 and 12, measure the pressure differential of the polymer P2 solution circulating in the recirculation loop with the pressure differential in-line measuring apparatus, optionally continuously measure the turbidity of the polymer P2 solution within the reactor, when the variation of the pressure differential of the polymer P2 solution reaches a value comprised between 100% and 500%, add acid into the reactor and stop the addition when the pH measuring probe indicates a pH comprised between 2.5 and 5.

Advantageously, the compound comprising at least one aldehyde function is added at a weight concentration from 1 to 30%.

Advantageously, the addition of acid into the reactor is performed when the variation of the pressure differential of the polymer P2 solution is comprised between 200% and 400%.

Preferably, upon completion of the process, the obtained polymer P2 solution is transferred with the recirculation pump into a stock tank provided with a means for detecting a low level of the polymer P2 solution, then all pipes and the reactor are rinsed with water to restart the process as described before when the low level of the stock tank is detected.

Advantageously, the invention also relates to a method for obtaining paper or cardboard comprising the addition into the fibrous suspension, of a polymer P2 solution obtained according to the previously-described method.

In general, the dry matter of the fibrous suspension is based on cellulose fibres and on charges, advantageously consisting of cellulose fibres and charges. The term "cellulose fibres" encompasses any cellulose entity, including fibres, fines, microfibrils or nanofibrils. By fibrous suspension, it should be understood the thick pulp or the diluted pulp which are based on water and on cellulose fibres.

The polymer P2 is added into the papermaking process, before or after formation of the paper, cardboard sheet or the same. Thus, setting the cellulose matter into contact with the polymer of the invention may be performed in different manners and in particular according to typical methods known to a person skilled in the art. The polymer P2 could be applied by an impregnation technique, it could be directly added into the fibrous suspension at any location of the paper manufacturing process where dry strength agents are usually introduced.

Thus, the polymer P2 could be introduced into the thick pulp (or thick stock) or into the diluted pulp (or thin stock). It could be added at the mixing pump or at the filtering sieve. Preferably, the polymer P2 will be introduced before the headbox.

Preferably, the polymer according to the invention is industrially injected into the fibrous suspension, i.e. before dilution thereof with the white waters (thick pulp). The consistency of the pulp is in the range of 2 to 5% by weight of cellulose fibres.

The papermaking process according to the invention may be implemented with any type of paper pulp such as virgin fibre pulps (Kraft, Bisulphite), recycled fibres, deinked pulps, mechanical and thermomechanical pulps.

Advantageously, the polymer P2 prepared according to the method of the invention with a piece of equipment according to the invention proximate to the papermaking machine.

The following examples illustrate the invention yet without limiting its scope.

BRIEF DESCRIPTION OF THE DRAWINGS

The FIGURE is a schematic representation of the equipment of the invention.

DETAILED DESCRIPTION OF AN EXEMPLARY EMBODIMENT

Example 1

This equipment essentially comprises a reactor (1) provided with a stirring system (2), the reactor being connected to a recirculation loop (3). The recirculation loop (3) is in the form of a duct projecting from the bottom (4) of the reactor (1) also referred to as "outlet" of the recirculation loop and whose opposite end is connected to an upper level (5) of the reactor (1).

The equipment further has pipes intended to feed the reactor with the reactants used to obtain the end product.

These consist of the ducts (7), (8) and (9) feeding the top of the reactor respectively with water, acid and base.

The polymer and the compound comprising at least one aldehyde function are introduced into the recirculation loop (3) via the ducts (10) and (11) respectively.

According to an essential feature of the equipment of the invention, the recirculation loop (3) successively has different elements from the outlet (4) of the reactor up to the inlet (5) in the reactor, namely a recirculation pump (12), a pH probe (13) and finally a pressure differential in-line measuring device (14).

The device (14) comprises, in the flow direction of the polymer, a control valve (15) allowing maintaining a constant flow rate, a flowmeter (16) allowing measuring and regulating the flow rate downstream of the control valve (15), a calibrated tube (17) creating a pressure drop and a pressure differential measuring apparatus (18) positioned between the inlet and the outlet of the calibrated tube, able to measure the pressure drop of the fluid after passage of said fluid in the calibrated tube.

The equipment of the invention further comprises a turbidimeter (19) connected on the recirculation loop (3).

The device (14) is branched on the recirculation loop between a point (20) upstream of the recirculation pump and a point (21) downstream of the inlets (10) and (11) of the reactants.

Finally, the equipment comprises a stock tank (22) provided with a means for detecting a low level of the polymer P2 solution allowing triggering the supply of the reactor (6) with water when the low level of the stock tank is detected.

Example 2

Preparation of a Polymer P1a Solution (AM/DADMAC (95/5 Mol %)): Polymerisation Priming P1a with SPS and Filtered Acrylamide Solution In a 1-litre reactor equipped with a mechanical stirrer, a thermometer, a refrigerant and a nitrogen gas plunger, 333.8 g of water, 50.1 g of diallyldimethylammonium chloride (DADMAC, 64% by weight in water) are introduced. The pH of the solution is set at 2.5 with sulphuric acid. The medium is heated and maintained at a temperature comprised between 79 and 81° C. thanks to a water bath. Thanks to two continuous castings, are incorporated 535.8 g of a filtered acrylamide solution (solution at 50% by weight) for 90 minutes and a sodium persulfate solution (SPS, 10% by weight in water) for 90 minutes. After 30 minutes of ageing, 0.26 g of sodium bisulphite (solution at 40% by weight) are added to make the possible residual monomers react. A new ageing for 60 minutes is applied before cooling. The obtained polymer P1a solution has a pH of 5.0, a polymer mass concentration of 30.1% and a Brookfield viscosity (LV3 modulus, 12 rpm, 25° C.) of 8,500 centipoises (cps).

Preparation of a Polymer P2a Solution (Reaction Monitored by Turbidimeter)

In a 1-litre reactor equipped with a mechanical stirrer, 46.4 g of the polymer P1a polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by turbidity. Once the turbidity variation (Hanna turbidimeter) of the polymer P2a solution is equal to +2 NTU, the reaction is stopped by lowering the pH to less than 3.5 by adding sulphuric acid (92% by weight in water). The Brookfield viscosity (LV1 modulus, 60 rpm, 25° C.) of the polymer P2a solution (weight concentration: 2%) obtained in this manner amounts to 55 cps.

Preparation of a Polymer P2b Solution (Reaction Monitored by Pressure Differential Delta P Measurement)

In a 1-litre reactor equipped with a mechanical stirrer, 46.4 g of the polymer P1a polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by measuring DeltaP of the polymer P2b solution (pressure differential measuring apparatus: calibrated tube with a diameter: 2 mm and a length: 2.2 m, P2b solution flow rate: 21 mL·min$^{-1}$). Once the Delta P has varied by +300%, the reaction is stopped by lowering the pH to less than 3.5 by adding sulphuric acid (92% by weight in water). The Brookfield viscosity (LV1 modulus, 60 rpm, 25° C.) of the polymer P2b solution (weight concentration: 2%) obtained in this manner amounts to 54 cps.

Example 3

Preparation of a polymer P1b solution (AM/DADMAC (95/5 mol %)): polymerisation priming P1b with SPS and non-filtered acrylamide solution In a 1-litre reactor equipped with a mechanical stirrer, a thermometer, a refrigerant and a nitrogen gas plunger, 333.8 g of water, 50.1 g of diallyldimethylammonium chloride (DADMAC, 64% by weight in water) and 500 ppm of biocatalyst/arylamide are introduced. The pH of the solution is set at 2.5 with sulphuric acid. The medium is heated and maintained at a temperature comprised between 79 and 81° C. thanks to a water bath. Thanks to two continuous castings, are incorporated 535.8 g of a filtered acrylamide solution (solution at 50% by weight) for 90 minutes and a sodium persulfate solution (SPS, 10% by weight in water) for 90 minutes. After 30 minutes of ageing, 0.26 g of sodium bisulphite (solution at 40% by weight) are added to make the possible residual monomers react. A new ageing for 60 minutes is applied before cooling. The obtained polymer P1 b solution has a pH of 4.8, a polymer mass concentration of 29.9% and a Brookfield viscosity (LV3 modulus, 12 rpm, 25° C.) of 8,900 centipoises (cps).

Preparation of a Polymer P2c Solution (Reaction Monitored by Turbidimeter)

In a 1-litre reactor equipped with a mechanical stirrer, 46.4 g of the polymer P1 b polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by turbidity. Once the turbidity variation (Hanna turbidimeter) of the polymer P2c solution is equal to +2 NTU, the reaction is stopped by lowering the pH to less than 3.5 by adding sulphuric acid (92% by weight in water). The Brookfield viscosity (LV1 modulus, 60 rpm, 25° C.) of the polymer P2c solution (weight concentration: 2%) obtained in this manner amounts to 15 cps.

Preparation of a Polymer P2d Solution (Reaction Monitored by Pressure Differential Delta P Measurement)

In a 1-litre reactor equipped with a mechanical stirrer, 46.4 g of the polymer P1 b polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by measuring DeltaP of the polymer P2d solution (pressure differential measuring apparatus: calibrated tube with a diameter: 2 mm and a length: 2.2 m, P2d solution flow rate: 21 mL·min$^{-1}$). Once the Delta P has varied by +300%, the reaction is stopped by lowering the pH to less than 3.5 by adding sulphuric acid (92% by weight in water). The Brookfield viscosity (LV1 modulus, 60 rpm, 25° C.) of the polymer P2d solution (weight concentration: 2%) obtained in this manner amounts to 53 cps.

Example 4

Preparation of a Polymer P1c Solution (AM/DADMAC (95/5 Mol %)): Polymerisation Priming P1c with V50 and Filtered Acrylamide Solution In a 1-litre reactor equipped with a mechanical stirrer, a thermometer, a refrigerant and a nitrogen gas plunger, 333.8 g of water, 50.1 g of diallyldimethylammonium chloride (DADMAC, 64% by weight in water) are introduced. The pH of the solution is set at 2.5 with sulphuric acid. The medium is heated and maintained at a temperature comprised between 79 and 81° C. thanks to a water bath. Thanks to two continuous castings, are incorporated 535.8 g of a filtered acrylamide solution (solution at 50% by weight) for 90 minutes and a V50 (2,2'-azobis 2-methylpropionamidine dihydrochloride, 10% by weight in water) solution for 90 minutes. After 30 minutes of ageing, 0.26 g of sodium bisulphite (solution at 40% by weight) are added to make the possible residual monomers react. A new ageing for 60 minutes is applied before cooling. The obtained polymer P1c solution has a pH of 5.0, a polymer mass concentration of 30.1% and a Brookfield viscosity (LV3 modulus, 12 rpm, 25° C.) of 8,420 centipoises (cps).

Preparation of a Polymer P2e Solution (Reaction Monitored by Turbidimeter)

In a 1-litre reactor equipped with a mechanical stirrer, 46.4 g of the polymer P1c polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by turbidity. No turbidity variation (Hanna turbidimeter) by n of the polymer P2e solution is observed. The polymer P2e solution gels quickly.

Preparation of a Polymer P2f Solution (Reaction Monitored by Pressure Differential Delta P Measurement)

In a 1-litre reactor equipped with a mechanical stirrer, 46.4 g of the polymer P1c polymer and 748.4 g of water are introduced. The reactor is provided with a pH probe. After 10 minutes of stirring, 5.22 g of glyoxal at 40% (by weight in water) are introduced and then the pH is set at 10.2 with a soda solution at 10% (by weight in water). The temperature is maintained between 20 and 22° C. The progress of the reaction is monitored by measuring DeltaP of the polymer P2f solution (pressure differential measuring apparatus: calibrated tube with a diameter: 2 mm and a length: 2.2 m, P2f solution flow rate: 21 mL·min$^{-1}$). Once the Delta P has varied by +300%, the reaction is stopped by lowering the pH to less than 3.5 by adding sulphuric acid (92% by weight in water). The Brookfield viscosity (LV1 modulus, 60 rpm, 25° C.) of the polymer P2f solution (weight concentration: 2%) obtained in this manner amounts to 57 cps.

The results of Examples 1 to 3 are summarized in Table 1

TABLE 1

| Priming | Acryl-amide filtering | polymer viscosity (cps) | | Monitoring technology | Parameters | Brookfield viscosity (cps) |
|---|---|---|---|---|---|---|
| P1a | Sodium persulfate | yes | 8,500 | P2a | Turbidity | 2 NTU | 55 |
| | | | | P2b | Delta P | 300% | 54 |
| P1b | Sodium persulfate | no | 8,900 | P2c | Turbidity | 2 NTU | 15 |
| | | | | P2d | Delta P | 300% | 53 |
| P1c | Azo V50 | yes | 8,420 | P2e | Turbidity | 2 NTU | gel |
| | | | | P2f | Delta P | 300% | 57 |

The solutions of polymers P1a and P1b differ in that the P1b solution contains a biocatalyst (a common impurity originating from the acrylamide obtained through an enzymatic process). Thus, monitoring of the glyoxalation of these polymers by turbidity leads to polymers with different Brookfield viscosities while when monitoring of the reaction is performed by measuring the pressure differential variation, the obtained polymers have equivalent Brookfield viscosities.

When priming for the obtainment of the polymers changes (P1a and P1c), this has an effect on monitoring of the glyoxalation reaction of these polymers by turbidity. The obtained polymers are different: a solution (P2a) and a gel (P2e).

However, when monitoring of the glyoxalation reaction is performed by measuring the pressure differential variation, the obtained polymers have equivalent Brookfield viscosities.

Example 5: Application Testing of the Polymers P2

For these examples, pulps of recycled fibres are used.

The wet pulp is obtained by dry pulp disintegration in order to obtain a final aqueous concentration of 1% by weight. It consists of a pulp with a neutral pH composed by 100% of fibres of recycled cardboard.

Metering of each polymer P2 amounts to 2.5 dry kg/ton of paper.

Assessment of Drainage (DDA) Performances

The DDA (Dynamic Drainage Analyser) allows automatically determining the time (in seconds) necessary to drain a fibrous suspension under vacuum. The polymers are added to the wet pulp (0.6 litre of pulp at 1.0% by weight) into the cylinder of the DDA under stirring at 1,000 rpm:

T=0 s: start of pulp stirring
T=10 s: addition of the polymer P2
T=30 s: stop of stirring and drainage under vacuum at 200 mBar for 60 s The pressure under the fabric is recorded over time. Once all of the water is evacuated off the fibrous mattress, air passes through the latter thereby revealing a slope breaking point in the curve representing the pressure under the fabric over time. The time, expressed in seconds, reported at this slope breaking point corresponds to the drainage time. Hence, the shorter the time, the better the vacuum drainage is.

Performances in DSR (Dry Strength) Application, Grammage at 80 g·m−2

The necessary amount of pulp is sampled so as to ultimately obtain a sheet having a grammage of 80 g·m−2.

The wet pulp is introduced into the vat of the dynamic sheet former and is kept under stirring. The different components of the system are injected into this pulp according to the predefined sequence. In general, a contact time from 30 to 45 seconds between each polymer addition is met.

Paper sheet formers are made with an automatic sheet former: a blotter and the forming fabric are placed in the bowl of the dynamic sheet former before starting the rotation of the bowl at 1,000 rpm and building the water wall. The processed pulp is distributed over the water wall to form the fibrous mattress over the forming fabric.

Once water has been drained, the fibrous mattress is recovered, pressed under a press outputting 4 bars, and then dried at 117° C. The obtained sheet is conditioned for one night in a room with controlled humidity and temperature (50% of relative humidity and 23° C.). The dry strength properties of all sheets obtained through this procedure are then measured.

Bursting is measured with a Messmer Buchel M 405 burst tester according to the standard TAPPI T403 om-02. The result is expressed in kPa. The burst index is determined, expressed in kPa·m$^2$/g, by dividing this value by the grammage of the tested sheet.

The dry breaking length is measured in the machine direction with a tensile apparatus Testometric AX according to the standard TAPPI T494 om-01. The result is expressed in km.

The results of the application testing of the polymers P2 obtained in Examples 1 to 3 are summarised in Table 2 (% increase with respect to a control).

TABLE 2

| Polymer | % Burst index | % DBL MD | % drainage |
|---|---|---|---|
| P2a | 21.4 | 16.2 | 34.8 |
| P2c | 15.8 | 10.6 | 19.4 |
| P2b | 21.4 | 16.2 | 34.8 |
| P2d | 21.9 | 16.2 | 34.2 |
| P2f | 21.9 | 16.5 | 35.1 |

The polymer P2c, which contains an impurity (biocatalyst) for which the glyoxalation reaction has been monitored by turbidimetry, has lower performances in terms of burst, dry strength and vacuum drainage in comparison with the polymers obtained in an identical manner (P2d) but with a monitoring of the glyoxalation reaction by measuring the pressure differential.

In addition, the polymers P2b and P2f, respectively obtained by glyoxalation of polymers P1a and P1c the priming thereof during the polymerisation thereof was different (V50/SPS), have equivalent performances in terms of dry strength of the paper and vacuum drainage when monitoring of the glyoxalation reaction has been performed by measuring the pressure differential.

The invention claimed is:

1. Equipment for preparing a polymer solution of a non-ionic, cationic, anionic or amphoteric polymer by reaction between a compound comprising at least one aldehyde function and at least one aqueous solution of a base polymer comprising at least one non-ionic monomer selected from among acrylamide, methacrylamide, N,N-dimethylacrylamide, and acrylonitrile, said equipment comprising a reactor provided with a stirring system; as well as at least:
   a pipe configured to feed the reactor with water,
   a pipe equipped with a metering pump configured to feed the reactor with the at least one aqueous solution,
   a pipe equipped with a metering pump configured to feed the reactor with the compound comprising at least one aldehyde function,
   a pipe equipped with a metering pump configured to feed the reactor with base, and
   a pipe equipped with a metering pump configured to feed the reactor with acid,
   said reactor comprising a recirculation loop configured to make the polymer solution recirculate from a bottom of the reactor towards an upper level of the reactor, characterised in that said recirculation loop comprises between an outlet of the reactor and an inlet of the reactor, a recirculation pump, a pH measuring probe, and a pressure differential in-line measuring device in the form of a calibrated tube configured to measure a pressure difference of the polymer solution between an inlet and an outlet of said calibrated tube, said calibrated tube being positioned in a bypass of the recirculation loop.

2. The equipment according to claim 1, characterised in that the pressure differential in-line measuring device is positioned on either side of the recirculation pump.

3. The equipment according to claim 1, characterised in that the pressure differential in-line measuring device further comprises:
   a control valve allowing for maintenance of a constant flow rate in the calibrated tube, and
   a flowmeter allowing for measurement and regulation of a flow rate downstream of the control valve.

4. The equipment according to claim 3, characterised in that the pressure differential in-line measuring device comprises, downstream of the control valve, a duplex filter with meshes between 5 to 50 microns.

5. The equipment according to claim 4, characterised in that the pressure differential in-line measuring device comprises, between the duplex filter and the control valve, a pulsation dampener of the recirculation loop.

6. The equipment according to claim 1, characterised in that the equipment further comprises a turbidimeter directly connected on the recirculation loop of the reactor.

7. A method for preparing a polymer solution of a non-ionic, cationic, anionic or amphoteric polymer derived from a reaction between a compound comprising at least one aldehyde function and at least one aqueous solution of a base polymer comprising at least one non-ionic monomer selected from among acrylamide, methacrylamide, N,N-dimethylacrylamide, and acrylonitrile, by employing the equipment of claim 1, said method comprising the following successive steps:
   feeding the reactor with water and activating the recirculation pump,
   feeding the reactor with the at least one aqueous solution of the base polymer and activating the stirring system,
   feeding the reactor with the compound comprising the at least one aldehyde function,
   feeding the reactor with base and stopping the addition when the pH measuring probe indicates a pH between 8 and 12,
   measuring the pressure differential of the polymer solution circulating in the recirculation loop with the pressure differential in-line measuring device,
   optionally continuously measuring a turbidity of the polymer solution within the reactor, and
   when a variation of the pressure differential of the polymer solution reaches a value between 100% and 500%, adding acid into the reactor and stopping the addition of the acid when the pH measuring probe indicates a pH between 2.5 and 5.

8. The method for preparing a polymer solution according to claim 7, characterised in that the method further comprises the following steps:
   transferring the obtained polymer solution with the recirculation pump into a stock tank provided with a sensor for detecting a level of the polymer solution,
   rinsing all pipes and the reactor with water, and
   feeding the reactor with water when the detected level of the stock tank is below a threshold level.

* * * * *